(12) United States Patent
Fontvielle et al.

(10) Patent No.: US 10,600,152 B1
(45) Date of Patent: Mar. 24, 2020

(54) SYSTEMS AND METHODS FOR PARALLAX COMPENSATION

(71) Applicant: GoPro, Inc., San Mateo, CA (US)

(72) Inventors: Adrien Fontvielle, San Mateo, CA (US); Antoine Meler, Chapareillan (FR); Benoit Fouet, Montbonnot (FR); Claire Mathis, Chambery (FR); Denys Bulant, San Mateo, CA (US); Emeric Grange, San Mateo, CA (US); Hervé Bonaillie, San Mateo, CA (US); Jerome Lehaire, San Mateo, CA (US); Julien Morat, Lancey (FR); Martin Arnoux, San Mateo, CA (US); Mickaël Heudre, San Mateo, CA (US); Renan Coudray, Montmelian (FR); Stéphane Gamet, San Mateo, CA (US); Thomas Vuillermet, Curienne (FR)

(73) Assignee: GoPro, Inc., San Mateo, CA (US)

( * ) Notice: Subject to any disclaimer, the term of this patent is extended or adjusted under 35 U.S.C. 154(b) by 83 days.

(21) Appl. No.: 15/974,924

(22) Filed: May 9, 2018

Related U.S. Application Data

(60) Provisional application No. 62/504,119, filed on May 10, 2017.

(51) Int. Cl.
| | | |
|---|---|---|
| *G06K 9/62* | (2006.01) | |
| *G06T 3/00* | (2006.01) | |
| *G06K 9/20* | (2006.01) | |
| *H04N 5/247* | (2006.01) | |

(52) U.S. Cl.
CPC ............. *G06T 3/0093* (2013.01); *G06K 9/20* (2013.01); *G06T 3/0012* (2013.01); *H04N 5/247* (2013.01); *G06K 2009/2045* (2013.01)

(58) Field of Classification Search
CPC ..... G06T 3/0093; G06T 3/0012; H04N 5/247; G06K 9/20; G06K 2009/2045
See application file for complete search history.

(56) References Cited

U.S. PATENT DOCUMENTS

| | | | | |
|---|---|---|---|---|
| 6,078,701 A | * | 6/2000 | Hsu ......................... | G06K 9/32 |
| | | | | 375/E7.086 |
| 6,788,333 B1 | * | 9/2004 | Uyttendaele ....... | H04N 5/23238 |
| | | | | 348/36 |
| 7,710,463 B2 | * | 5/2010 | Foote .................... | G06T 3/4038 |
| | | | | 348/218.1 |
| 2016/0353090 A1 | * | 12/2016 | Esteban ............. | G02B 27/0172 |
| 2017/0078653 A1 | * | 3/2017 | Bi ......................... | G06T 3/0062 |
| 2018/0184077 A1 | * | 6/2018 | Kato .................... | H04N 13/344 |

* cited by examiner

*Primary Examiner* — Samir A Ahmed
(74) *Attorney, Agent, or Firm* — Esplin & Associates, PC

(57) ABSTRACT

Images of a scene may be captured by a set of image capture devices. Overlapping areas of the images may be identified based on the topology of the set of image capture devices. Frontiers within the overlapping areas of the images may be identified based on borders of the images. Sample points for the images may be distributed along the frontiers. Warp parameters including an anti-symmetric warping portion and a symmetric warping portion may be determined at the sample points. Displacement values may be determined at the sample points based on the warp parameters. Warp maps for the images may be determined based on diffusion of the displacement values. Displacement maps for the images may be determined based on interpolation of the warp maps. The images may be modified based on the displacement maps.

20 Claims, 14 Drawing Sheets

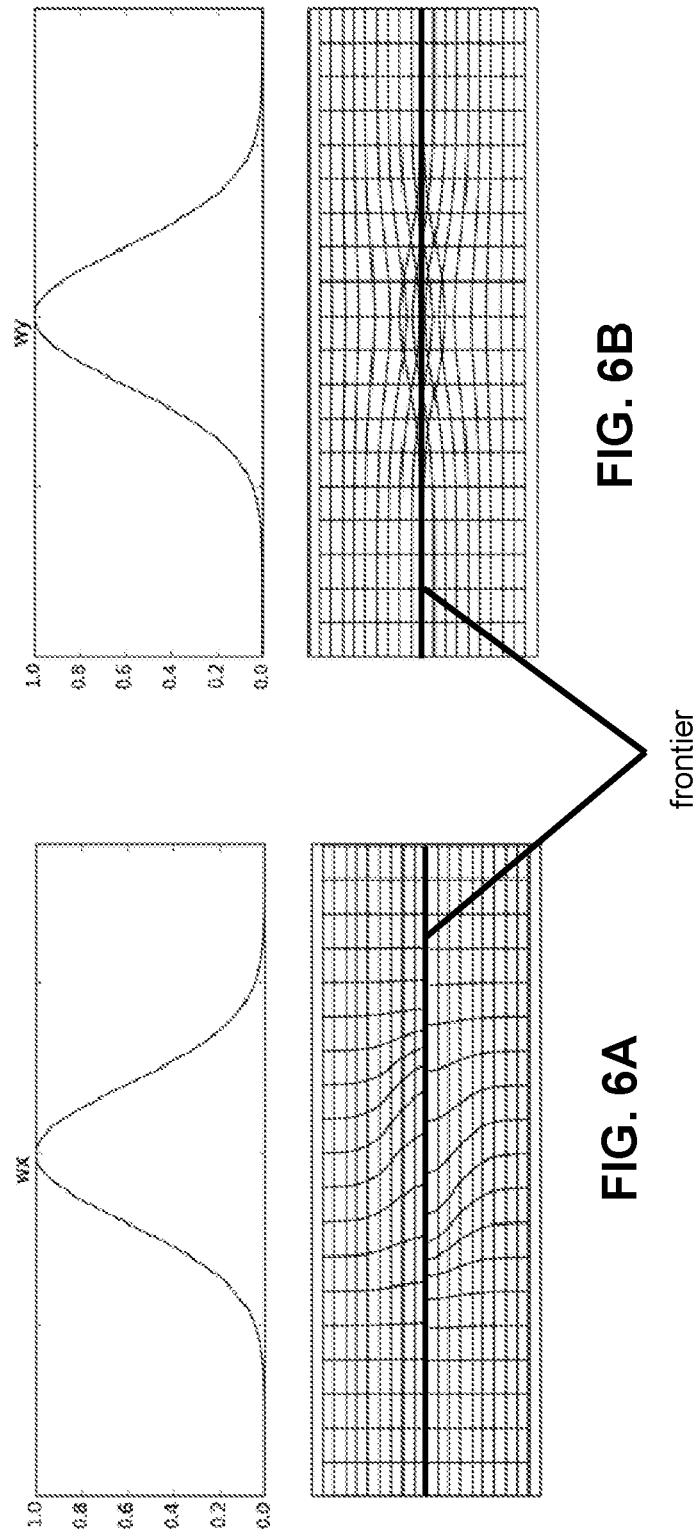

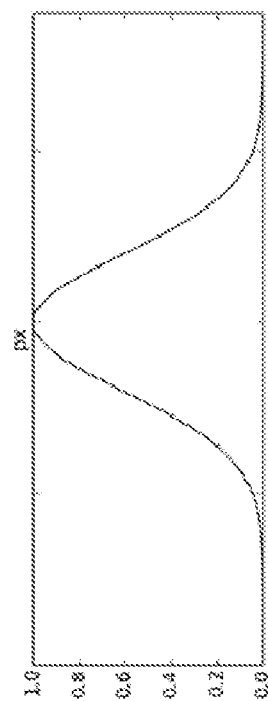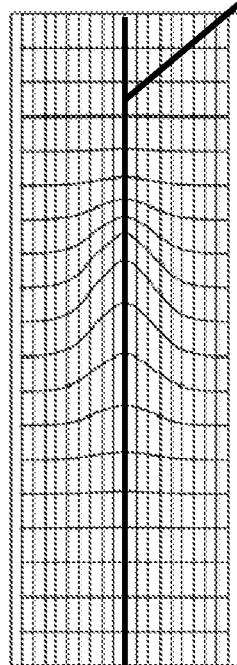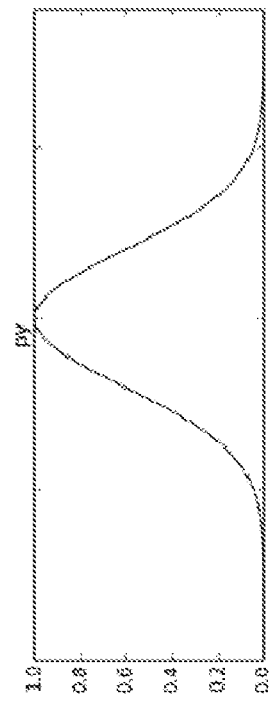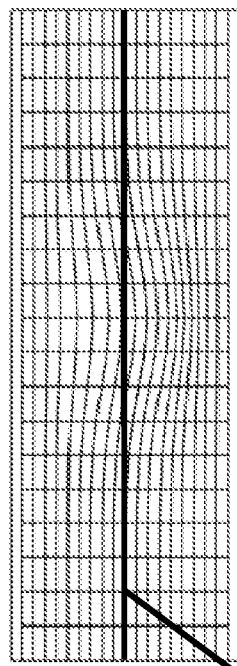
FIG. 6C  FIG. 6D
frontier

SYSTEMS AND METHODS FOR PARALLAX COMPENSATION

FIELD

This disclosure relates to compensating for parallax of multi-camera capture based on symmetric warping and anti-symmetric warping.

BACKGROUND

Spherical images/videos may include a capture of a scene using multiple cameras located at different positions. Images/videos captured by different cameras may be stitched together to form spherical images/videos. Because the scene is captured from different points of view, parallax may cause mismatch between boundaries of the stitched images/videos. Compensating for parallax may require prior knowledge of the geometry of the cameras used to capture the scene. Compensating for parallax may require stringent design constraints for the cameras, such as arranging the lens of the cameras such that all nodal points coincide. Compensating for parallax may require use of optical flows methods, which are computationally intensive.

SUMMARY

This disclosure relates to parallax compensation. Images including visual capture of a scene may be accessed. The images may include overlapping areas. The overlapping areas may include visual capture of same portions of the scene. The images may be captured by a set of image capture devices. The set of image capture devices may include a first image capture device comprising a first optical element and a second image capture device comprising a second optical element. The set of image capture devices may be arranged in a topology during the capture of the images. The topology may be characterized by orientations, focals, distortions, and optical centers of the first optical element and the second optical element.

The topology may be determined based on visual analysis of the images. The overlapping areas of the images may be identified based on the topology. Frontiers within the overlapping areas of the images may be identified based on borders of the images. The frontiers may include points of farthest distances from the borders of the images. Individual frontiers may be defined by two corners. Sample points for the images may be distributed along the frontiers. Warp parameters may be determined at the sample points. The warp parameters may include an anti-symmetric warping portion and a symmetric warping portion. Displacement values may be determined at the sample points based on the warp parameters. Warp maps for the images may be determined based on diffusion of the displacement values. Displacement maps for the images may be determined based on interpolation of the warp maps. The images may be modified based on the displacement maps.

A system that provides parallax compensation may include one or more processors, and/or other components. The processor(s) may be configured by machine-readable instructions. Executing the machine-readable instructions may cause the processor(s) to facilitate providing parallax compensation. The machine-readable instructions may include one or more computer program components. The computer program components may include one or more of an access component, a topology component, an overlapping area component, a frontier component, a sample point component, a warp parameter component, a displacement component, a warp map component, a displacement map component, image modification component, and/or other computer program components.

The access component may be configured to access images and/or other information. Accessing the images may include one or more of acquiring, analyzing, determining, examining, locating, obtaining, receiving, retrieving, reviewing, storing, and/or otherwise accessing the images. The access component may access images from one or more locations. The access component may be configured to access images during capture of the images and/or after capture of the images by one or more image capture devices.

The images may include visual capture of a scene and/or other information. The images may include overlapping areas and/or other areas. The overlapping areas may include visual capture of same portions of the scene. The images may be captured by a set of image capture devices. In some implementations, the images may include video frames of videos captured by the set of image capture devices.

The set of image capture devices may include a first image capture device comprising a first optical element, a second image capture device comprising a second optical element, and/or other image capture devices. The set of image capture devices may be arranged in a topology during the capture of the images. The topology may be characterized by orientations, focals, distortions, and/or optical centers of the first optical element, the second optical element, and/or other optical elements, and/or other information.

The topology component may be configured to determine the topology. The topology may be determined based on visual analysis of the images and/or other information.

The overlapping area component may be configured to identify the overlapping areas of the images. The overlapping areas may be identified based on the topology and/or other information.

The frontier component may be configured to identify frontiers within the overlapping areas of the images. The frontiers may be identified based on borders of the images and/or other information. The frontiers may include points of farthest distances from the borders of the images and/or other points. Individual frontiers may be defined by two corners.

The sample point component may be configured to distribute sample points for the images along the frontiers. The same number of sample points may be distributed along different frontiers. The number of sample points distributed along individual frontiers may be static or variable.

The warp parameter component may be configured to determine warp parameters at the sample points. The warp parameters may include an anti-symmetric warping portion, a symmetric warping portion, and/or other portions. In some implementations, the warp parameters may be determined based on visual similarity, spatial smoothness, temporal smoothness, and/or other information. In some implementations, the warp parameters may be determined based on positions of visual similarity between two of the images and/or other information. In some implementations, the warp parameters may be determined based on a sliding temporal window.

The displacement component may be configured to determine displacement values at the sample points. The displacement values may be determined based on the warp parameters and/or other information. In some implementations, the displacement values may be determined further based on a conversion of the warp parameters from a determination space (e.g., optimization space) to a source space. In some implementations, the warp parameters may be converted from the determination space to the source space based on the topology and/or other information.

The warp map component may be configured to determine warp maps for the images. The warp maps may be determined based on diffusion of the displacement values and/or other information. In some implementations, the warp maps may be determined further based on triangle meshes over the images. The triangle meshes may include triangles with sizes determined based on distances to the sample points and/or other information.

The displacement map component may be configured to determine displacement maps for the images. The displacement maps may be determined based on interpolation of the warp maps and/or other information.

The image modification component may be configured to modify the images. The images may be modified based on the displacement maps. The images may be modified and projected onto a spherical surface with no/less visible discontinuities along the seams.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 6A illustrates an example anti-symmetric warping parameter wx.

FIG. 6B illustrates an example anti-symmetric warping parameter wy.

FIG. 6C illustrates an example symmetric warping parameter px.

FIG. 6D illustrates an example symmetric warping parameter py.

DETAILED DESCRIPTION

Figure 1:
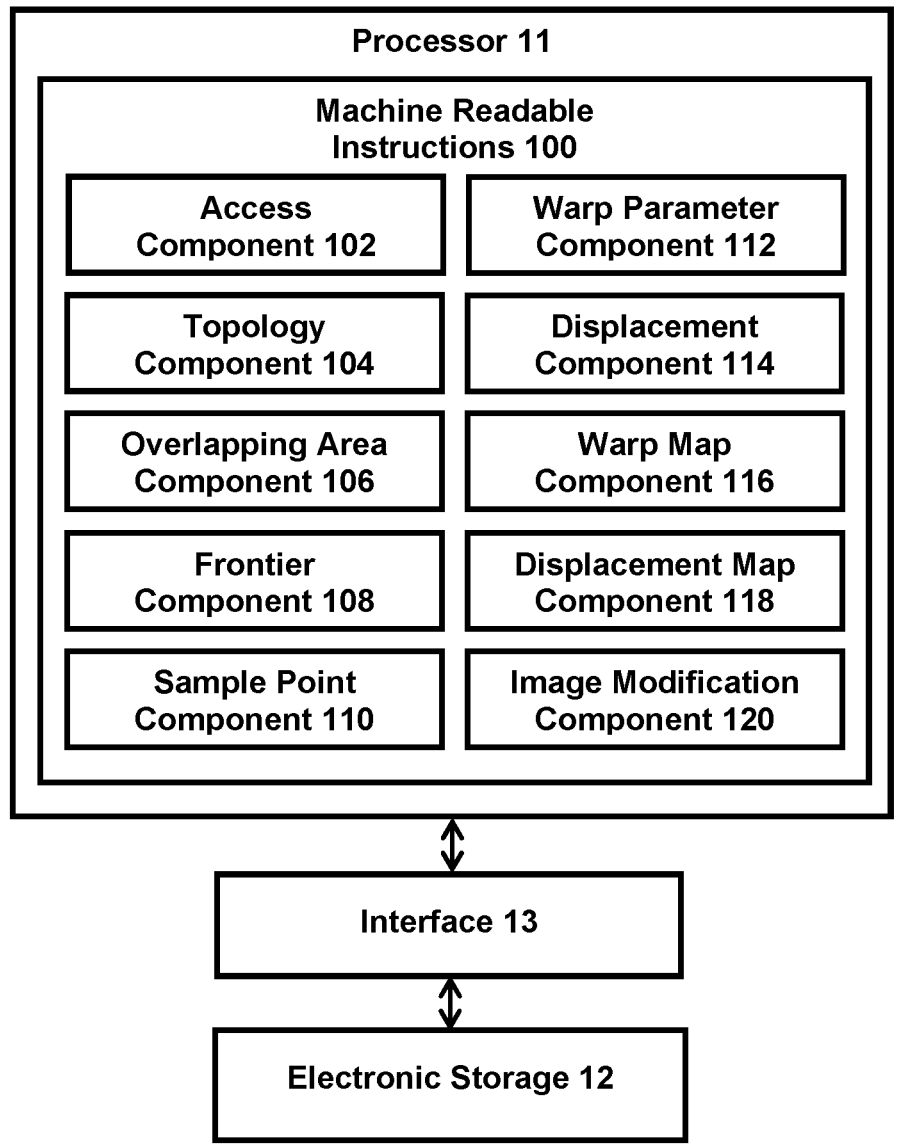
FIG. 1 illustrates a system that provides parallax compensation.

FIG. 1 illustrates a system 10 for providing parallax compensation. The system 10 may include one or more of a processor 11, an electronic storage 12, an interface 13 (e.g., bus, wireless interface), and/or other components. Images including visual capture of a scene may be accessed by the processor 11. The images may include overlapping areas. The overlapping areas may include visual capture of same portions of the scene. The images may be captured by a set of image capture devices. The set of image capture devices may include a first image capture device comprising a first optical element and a second image capture device comprising a second optical element. The set of image capture devices may be arranged in a topology during the capture of the images. The topology may be characterized by orientations, focals, distortions, and optical centers of the first optical element and the second optical element.

The topology may be determined based on visual analysis of the images. The overlapping areas of the images may be identified based on the topology. Frontiers within the overlapping areas of the images may be identified based on borders of the images. The frontiers may include points of farthest distances from the borders of the images. Individual frontiers may be defined by two corners. Sample points for the images may be distributed along the frontiers. Warp parameters may be determined at the sample points. The warp parameters may include an anti-symmetric warping portion and a symmetric warping portion. Displacement values may be determined at the sample points based on the warp parameters. Warp maps for the images may be determined based on diffusion of the displacement values. Displacement maps for the images may be determined based on interpolation of the warp maps. The images may be modified based on the displacement maps.

The systems and methods disclosed herein enable parallax compensation without prior knowledge of image capture devices configuration (e.g., multi-camera rig setup) used to capture spherical images/videos. Parallax among images captured by image capture devices in different locations may be compensated by using overlapping zones between fields of view (e.g., fields of view of different lenses) of the image capture devices. The amount of the overlap between the fields of view may be linked to the amount of parallax that may be corrected by the disclosed systems and methods.

The genericity of the problem formulation disclosed herein enables parallax compensation for image capture devices having different/unknown topologies. No explicit three-dimensional reconstructions or costly optical flow computations may be required to provide parallax compensation.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to images, overlapping areas, set of image capture devices, optical elements, topologies of the set of image capture devices, frontiers, corners, sample points, warp parameters, displacement values, warp maps, displacement maps, modifying images, and/or other information.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate providing parallax compensation. The machine readable instructions 100 may include one or more computer program components. The machine readable instructions 100 may include one or more of an access component 102, a topology component 104, an overlapping area component 106, a frontier component 108, a sample point component 110, a warp parameter component 112, a displacement component 114, a warp map component 116, a displacement map component 118, image modification component 120, and/or other computer program components.

The access component 102 may be configured to access images and/or other information. Accessing the images may include one or more of acquiring, analyzing, determining, examining, locating, obtaining, receiving, retrieving, reviewing, storing, and/or otherwise accessing the images. The access component 102 may access images from one or more locations. For example, the access component 102 may access the images from a storage location, such as the electronic storage 12, electronic storage of information and/or signals generated by one or more image sensors of image capture device(s) (not shown in FIG. 1), electronic storage of a device accessible via a network, and/or other locations. The access 102 may access the images from a hardware component (e.g., an image sensor/image capture device) and/or a software component (e.g., software running on a computing device).

The access component 102 may be configured to access images during capture of the images and/or after capture of the images by one or more image sensors/image capture devices. For example, the access component 102 may access the images while the images are being captured by image sensor(s)/image capture device(s). The access component 102 may access the images after the images have been captured and stored in memory (e.g., the electronic storage 12, buffer memory).

The images accessed by the access component 102 may include visual capture of one or more scenes and/or other information. The images may be captured by a set of image capture devices. In some implementations, the images may include video frames of videos captured by the set of image capture devices.

The image(s) may include spherical capture of the scene(s). Spherical capture may include full spherical capture or partial spherical capture of the scene(s). The images may include overlapping areas and/or other areas. The overlapping areas may correspond to overlapping fields of view of the optical elements (e.g., lens) of the set of image capture devices. The overlapping areas may include visual capture of same portions of a scene. For example, fields of view of two image capture devices may include overlapping area covering the same portion of the scene.

The set of image capture devices may include multiple image capture devices with multiple optical elements. For example, the set of image capture devices may include a first image capture device, a second image capture device, and/or other image capture devices. The set of image capture devices may include odd or even number of image capture devices. Individual image capture devices may include one or more optical elements, one or more images sensors, one or more electronic storage, and/or other components. The set of image capture devices may be arranged in a particular topology during the capture of the image(s). The topology may be characterized by orientations, focals, distortions, and/or optical centers of the optical element(s) of the set of image capture devices (e.g., optical elements of the first image capture device and the second image capture device and/or other information). Intrinsic parameters may include focals, distortions, optical centers, and/or other information. Extrinsic parameters may include orientations and/or other information.

Figure 3:
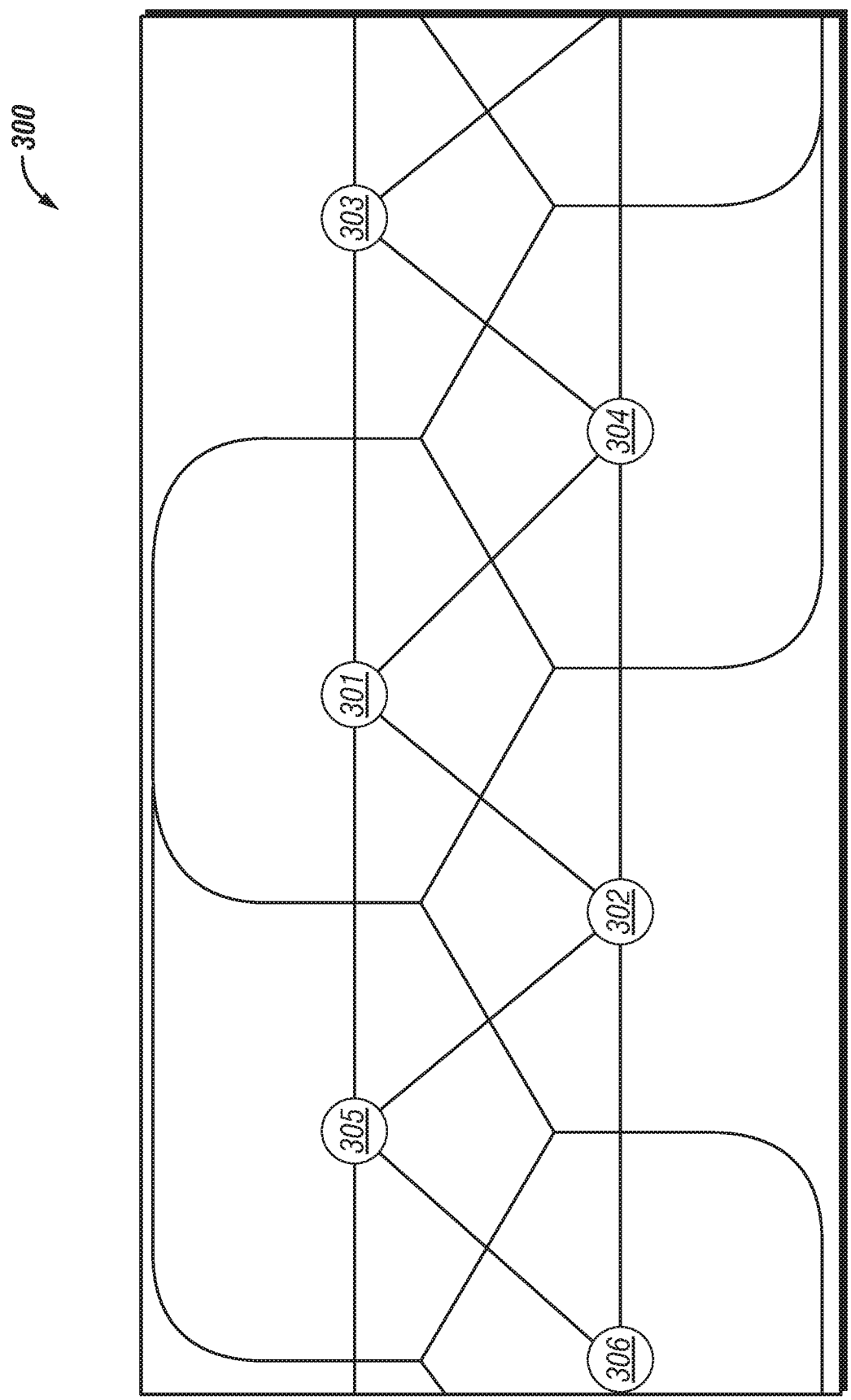
FIG. 3 illustrates an example configuration image capture devices for spherical image/video capture.

The topology component 104 may be configured to determine the topology. The topology may be determined based on visual analysis of the images and/or other information. For example, FIG. 3 illustrates an example configuration 300 of six image capture devices 301, 302, 303, 304, 305, 306 for spherical image/video capture. Individual image capture devices 301, 302, 303, 304, 305, 306 may include one or more neighbors—neighboring image capture devices may have overlapping fields of view. For example, in the configuration 300, the image capture device 301 may have neighboring image capture devices 302, 303, 304, and 305. Optical element(s) of the image capture device 301 may have field(s) of view that overlap with the fields of view of the optical elements of the image capture devices 302, 303, 304, and 305. Links between image capture devices 301, 302, 303, 304, 305, 306 may exist when the image capture devices 301, 302, 303, 304, 305, 306 have some overlapping fields of view. The topology of the image capture devices 301, 302, 303, 304, 305, 306 may not be previously known.

The topology component 104 may extract the topology of the set of image capture devices. The topology component 104 may track visual features from the images (e.g., video frames corresponding to capture at the same moment) and match them to determine the topology of the set of image capture devices and/or other information. For example, the topology component 104 may use visual analysis to determine orientations, focals, distortions, and/or optical centers of the optical elements of the set of image capture devices 301, 302, 303, 304, 305, 306. In some implementations, the topology may be determined using one or more stitching engines of the set of image capture devices.

Figure 4:
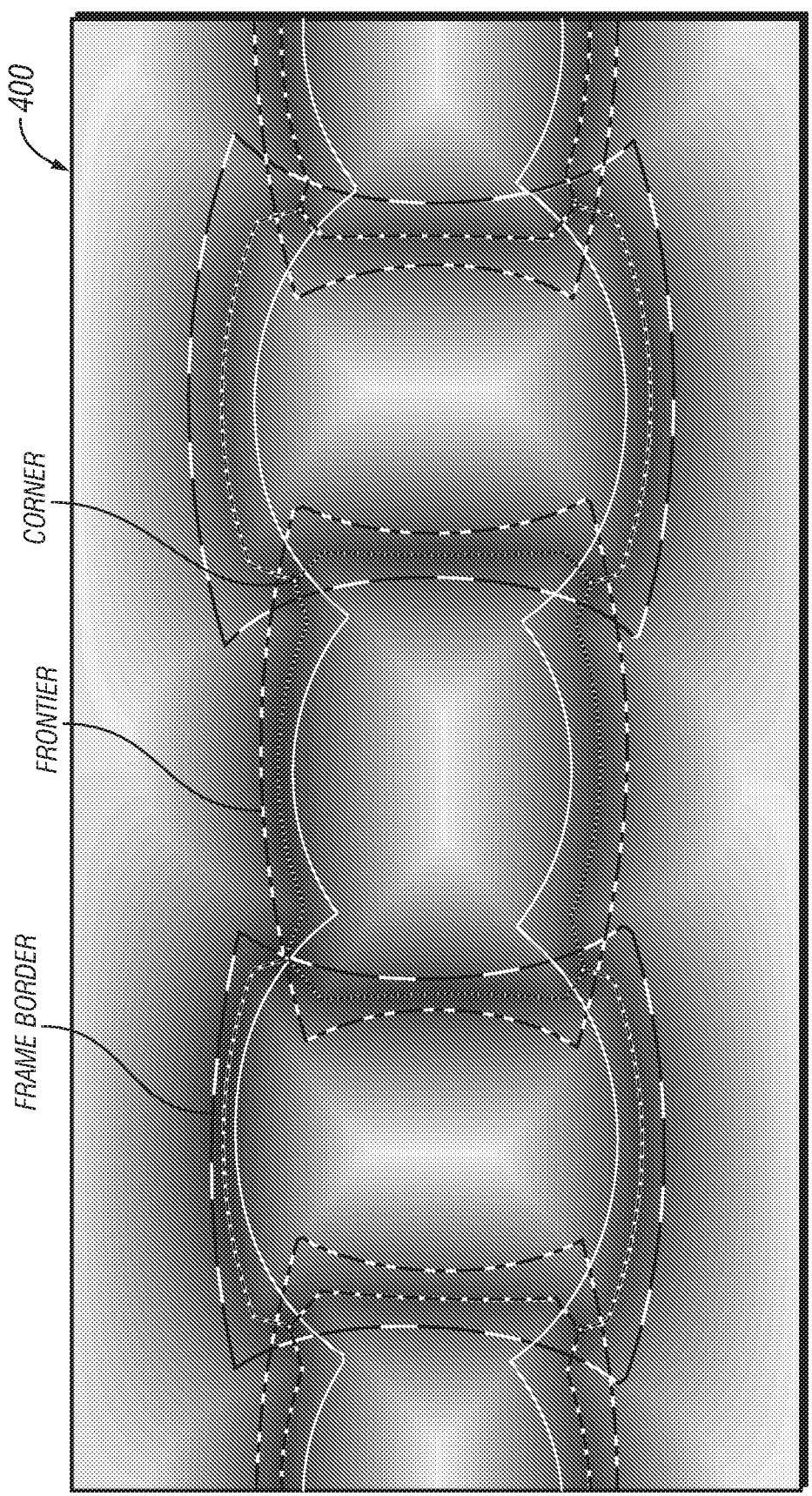
FIG. 4 illustrates an example projection of images onto a sphere using an equirectangular projection.

The overlapping area component 106 may be configured to identify the overlapping areas of the images. The overlapping areas may be identified based on the topology and/or other information. The overlapping area component 106 may extract overlapping areas within the images based on the topology (intrinsic parameters, extrinsic parameters) of the set of image capture devices. For example, FIG. 4 illustrates an example projection 400 of the images onto a sphere using an equirectangular projection. The dashed lines may show frame borders of individual image capture devices. The grey shades may materialize normalized distances to the frame borders.

The overlapping areas of the images may be characterized by frontiers, corners, and/or other features. Frontiers may refer to links between two corners within overlapping areas of the images. Frontiers may include seams between images/videos taken by the set of image capture devices. Frontiers may include paths in the valleys of the normalized distances to the frame borders. Frontiers may include points of farthest distances from the borders of the images and/or other points. For example, frontiers within overlapping areas of two images/image capture devices may include midway points between the borders of the two images taken by the two image capture devices (e.g., midway points between frame borders of the two image capture devices). Corners may refer to intersections between two or more frontiers. Individual frontiers may be defined by two corners.

Figure 5:
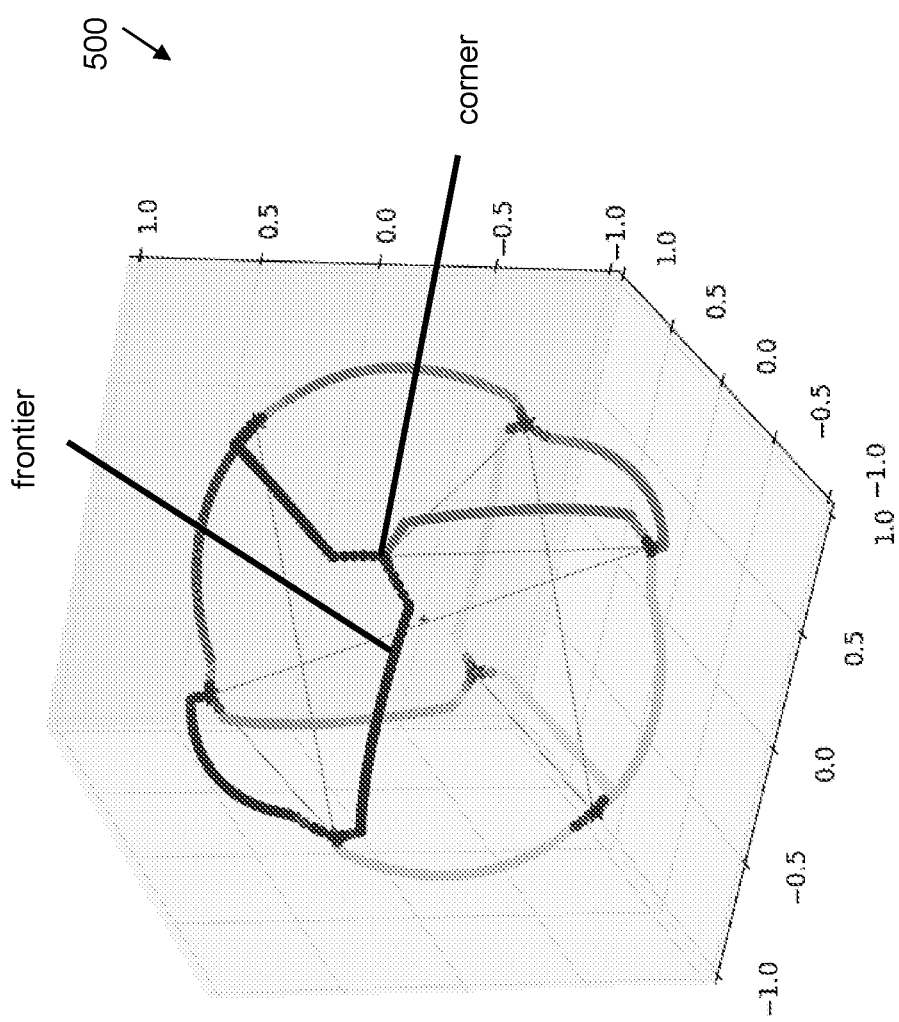
FIG. 5 illustrates an example representation in three-dimensional space of frontiers and corners shown in FIG. 4.

The projection 400 of the image onto a sphere using the equirectangular projection shown in FIG. 4 is provided for ease of reference/understanding. The system 10 may not use equirectangular projection for calculations/computations. FIG. 5 illustrates the frontiers and corners shown in FIG. 4. The frontiers and corners in FIG. 5 may be represented in three-dimensional space. The frontiers and corners may be considered as three-dimensional points on a sphere. As shown in FIG. 5, points may lie onto a unit sphere. The system 10 may process calculations/computations within a three-dimensional space, such as shown in FIG. 5.

The frontier component 108 may be configured to identify frontiers within the overlapping areas of the images. The frontiers may be identified based on borders of the images and/or other information. The frontier component 108 may determine paths in the overlapping areas that include farthest distances from the borders of the images/frame borders. The frontier component 108 may extract from the overlapping areas of the images the points that maximize the distance to every image/frame border (when projected onto a sphere).

The sample point component 110 may be configured to distribute sample points for the images along the frontiers. The same number or different numbers of sample points may be distributed along different frontiers. The number of sample points distributed along individual frontiers may be static or variable. A given number of sample points may be regularly spaced on the frontiers between corners. The use of the sample points may allow the system 10 to compute values for parallax compensation at the sample point positions rather than for whole paths of the sphere. The sample point positions may be used subject to the sample points being on the sphere, there being regular spacing between the sample points, and the sample points being along the frontiers.

The warp parameter component 112 may be configured to determine warp parameters at the sample points. The warp parameters may include one or more anti-symmetric warping portions, one or more symmetric warping portions, and/or other portions. An anti-symmetric warping may refer to a warping that reverses warping performed in one image to another image. FIGS. 6A-6B illustrate example anti-symmetric warping parameters wx and wy, in graph forms and warp grid forms. Anti-symmetric warping parameters wx and wy may include anti-symmetric warping around the equator. A symmetric warping may refer to a warping that mirrors warping performed in one image to another image. FIGS. 6C-6D illustrate example symmetric warping parameters px and py, in graph forms and warp grid forms. Symmetric warping parameters px and py may include symmetric warping around the equator. The top halves of the warp grids in FIGS. 6A-6D may illustrate warping for images taken by one image capture device and the bottom halves of the warp grids in FIGS. 6A-6D may illustrate warping for images taken by another image capture device.

Figure 7:
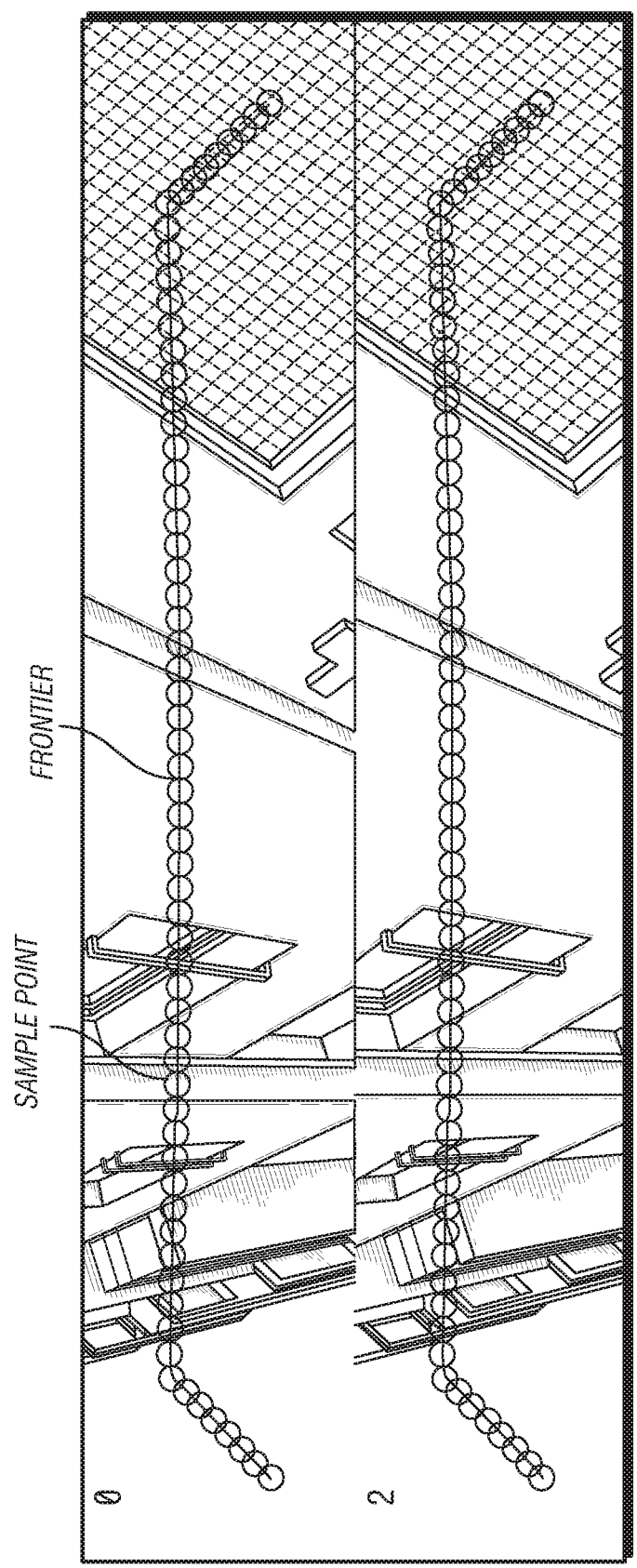
FIG. 7 illustrates example portions of two images taken by two image capture devices.

The warp parameters may be presented in a warp parameter determination space (e.g., warp parameter optimization space). The warp parameters may be expressed in pixels onto a two-dimensional surface (e.g., using equirectangular rejection mapping or other mapping methods) or onto a three-dimensional sphere. In the three-dimensional space, the warp parameters may be expressed in angle units to represent a displacement on a sphere. FIG. 7 illustrates example portions of two images taken by two image capture devices. The portions shown in FIG. 7 may include an equirectangular projection of the images cropped around the frontier between the two image capture devices. Sample points (e.g., sample points 0-63) may be represented by circles along the frontier. Parallax may cause different portions of the scene captured within the images to be located at different areas within the images. If there were no parallax, the two images would match. Lines within the circles may represent the amount/direction of warping to compensate for parallax.

Within the warp parameter determination space, for individual sample points at position $(x_i, y_i)$, similar visual patches may be identified to determine the anti-symmetric and symmetric portions of the warp parameter. In comparing two images, the desired positions may be defined as $(x_i+wx_i+px_i, y_i+wy_i+py_i)$ for one image/one image capture device and as $(x_i-wx_i+px_i, y_i-wy_i+py_i)$ for the other image/other image capture device. The warp parameters $(wx_i, wy_i, px_i, py_i)$ may be solved based on constraints using non-linear solver (such as Levenberg-Marquardt). The $(wx_i, wy_i)$ part may constrain the search in an antisymmetric fashion (much similar to what may happen if search was constrained along epipolar lines based on known image capture topology/geometry). The corners may require introduction of two additional parameters $(px_i, py_i)$ to avoid the problem being overconstrained (unsolvable). The problem to be solved may be formulated as finding $(wx_i, wy_i, px_i, py_i)$ for the sample points of the frontiers subject to a smoothness constraint between adjacent samples, a unified constraint at corners, a temporal smoothness constraint for a sample at different times, and/or other information.

Figure 8B:
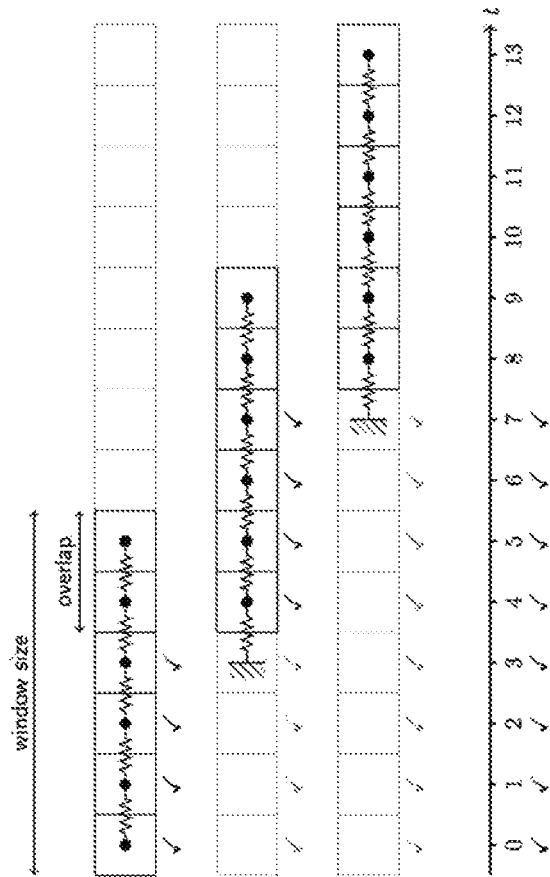
FIG. 8B illustrates an example use of a temporal sliding window.
Figure 8A:
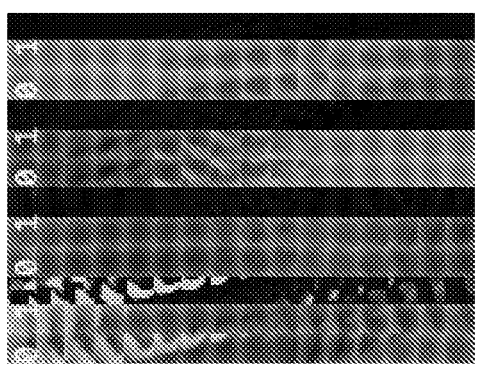
FIG. 8A illustrates example comparison of patches from images taken by two image capture devices.

The warp parameters may be determined based on visual similarity, spatial smoothness, temporal smoothness, and/or other information. Determining the warp parameters based on the visual similarity may include determining positions of visual similarity between two images and/or other information. For example, FIG. 8A illustrates example comparison of patches from images taken by two image capture devices. FIG. 8A shows the comparisons in a set of three columns, with the first column representing patches from one image/one image capture device, the second column representing patches from the other image/other image capture device, and the third column representing the dissimilarity/similarity between the patches.

Determining the warp parameters based on spatial smoothness may include determining the warp parameters based on values of warp parameters for neighboring samples. Spatial smoothness may place one or more constraints on how much the warp parameters for one sample point may differ from the warp parameters for adjacent sample point(s). Spatial smoothness may define the amount by which images may be warp from one sample position to the next sample position. The amount of spatial smoothness to constrain the warp parameters may be set by default, user input, and/or determined based on content of the images/videos.

Determining the warp parameters based on temporal smoothness may include determining the warp parameters based on values of warp parameters of the same sample point over a duration of time/over a range of video frames. Temporal smoothness may place one or more constraints on how much the warp parameters for one sample point may differ in sequential images (e.g., video frames) that were captured at different times. The amount of temporal smoothness to constrain the warp parameters may be set by defaults, user input, and/or determined based on content of the images/videos. The temporal smoothness constraint may not be applied when providing parallax compensation for a single spherical image.

The temporal smoothness constraint may be implemented using a temporal sliding window. Use of the temporal sliding window may ensure temporal continuity and provide for acceptable computation time. FIG. 8B illustrates example use of a temporal sliding window. As an example, the temporal sliding window may be used over five consecutive video frames and then shifted by four video frames. Other values for the temporal sliding window are contemplated. The values may be changed to provide higher quality result (at the expense of computation times) or lower quality result (for faster computation times).

The displacement component 114 may be configured to determine displacement values at the sample points. The displacement values may be determined based on the warp parameters and/or other information. The displacement values may be determined based on a conversion of the warp parameters from a determination space to a source space. The source space may refer to the image/frame source space. The warp parameters may be converted from the determination space to the source space based on the topology of the set of image capture devices and/or other information. The warp parameters may be converted from the determination space to the source space based on intrinsic and extrinsic parameters of the image capture devices, orientation of the determination space, and positions of the sample points in the source space. The warp parameters may be converted to the source space for individual images forming a spherical image/video.

Figure 9:
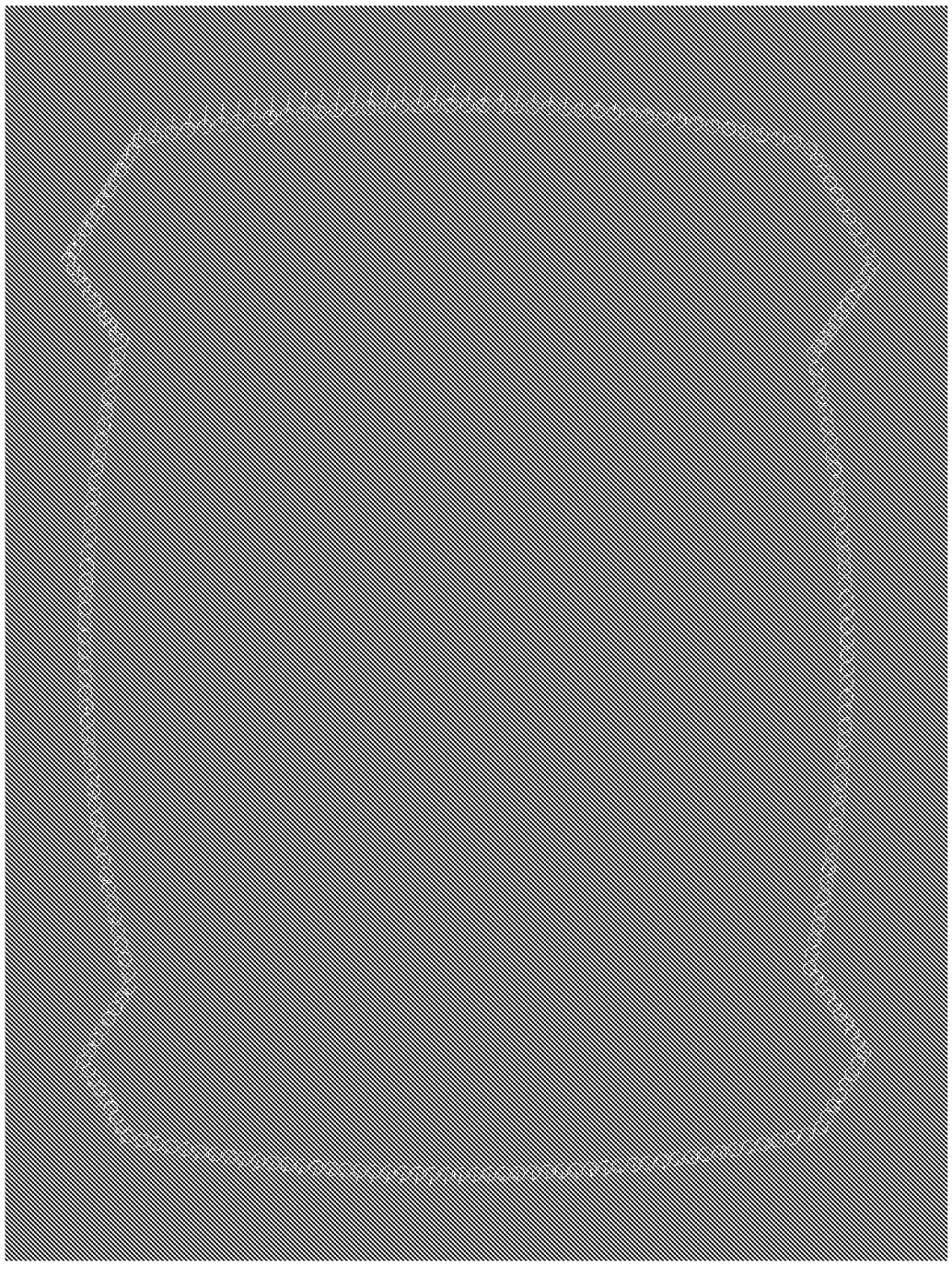
FIG. 9 illustrates example sample points in a source space.

For example, FIG. 9 illustrates example sample points in a source space for an image. In FIG. 9, the circles may represent sample points/positions. Lines within the circles represent the amount/direction of warping (e.g., displacement to apply) to compensate for parallax. The displacement values for individual samples may be defined as $(dx_i, dy_i)$. The determination of the displacement values at the sample points may allow the system 10 to solve the warping problem on a subset of the frontiers rather than along the entire frontiers. The displacement values may be regularized over other locations quickly and accurately. Thus, image deformation for parallax computation may be computed at sample points along the frontiers and the image deformation may be propagated (diffused) to the whole image. The deformed images may be projected to a spherical space for rendering.

The warp map component 116 may be configured to determine warp maps for the images. The warp maps may be determined based on propagation/diffusion of the displacement values and/or other information. For example, the displacement values may be propagated/diffused using heat propagation/diffusion. Other types of value propagation/diffusion are contemplated.

Figure 10:
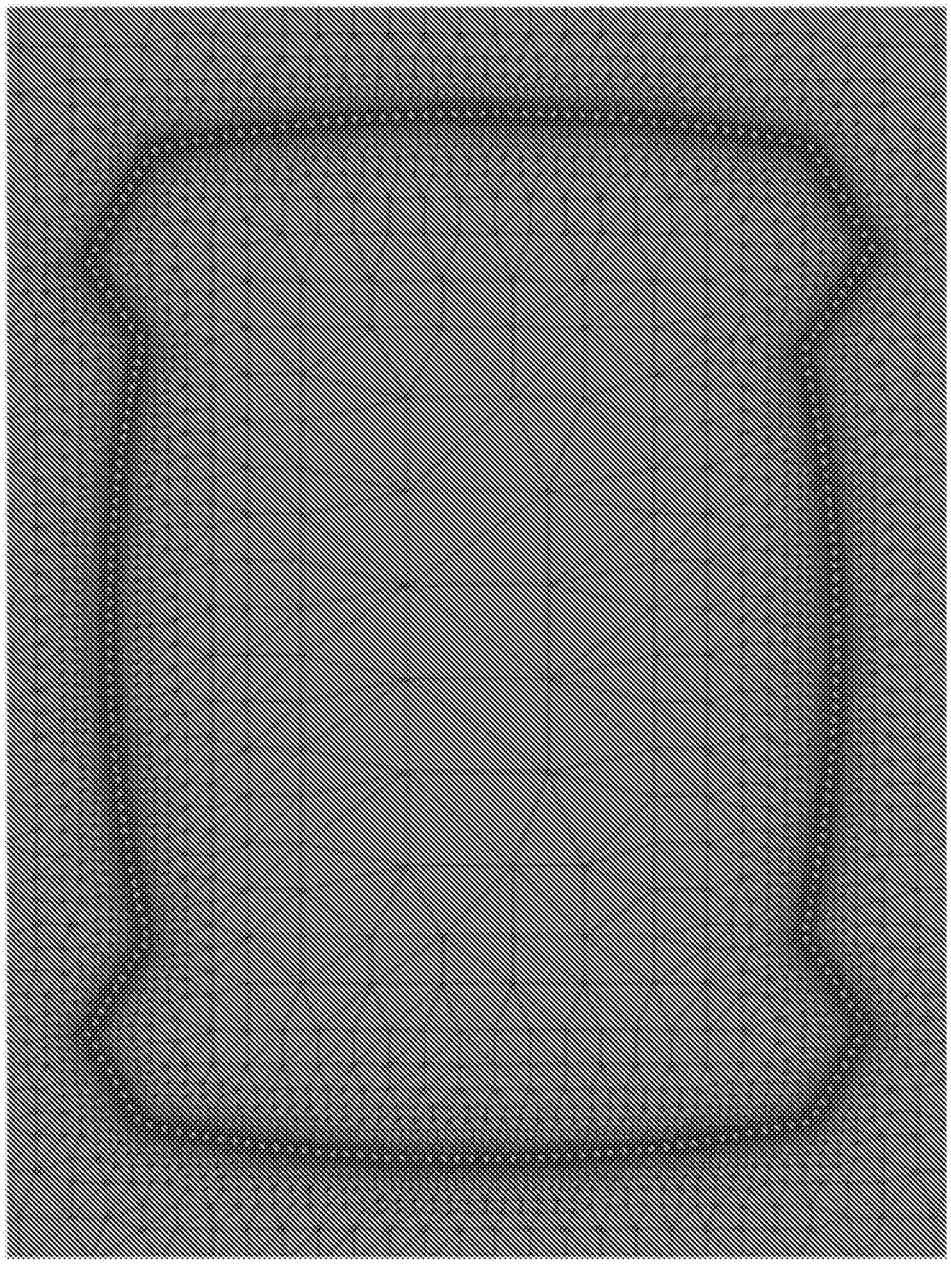
FIG. 10 illustrates an example triangle mesh for an image.

In some implementations, the warp maps may be determined further based on triangle meshes over the images. For example, heat propagation/diffusion may use triangle meshes to determine the amount of propagation/diffusion of displacement values. The triangle meshes may include triangles with sizes determined based on distances to the sample points and/or other information. For example, FIG. 10 illustrates an example triangle mesh for an image. The structure of the triangle mesh may be determined based on the sample points. The size of the triangles within the triangle mesh may be a function of two-dimensional distances to the sample points. Other types/shapes/sizes of meshes are contemplated.

Figure 11:
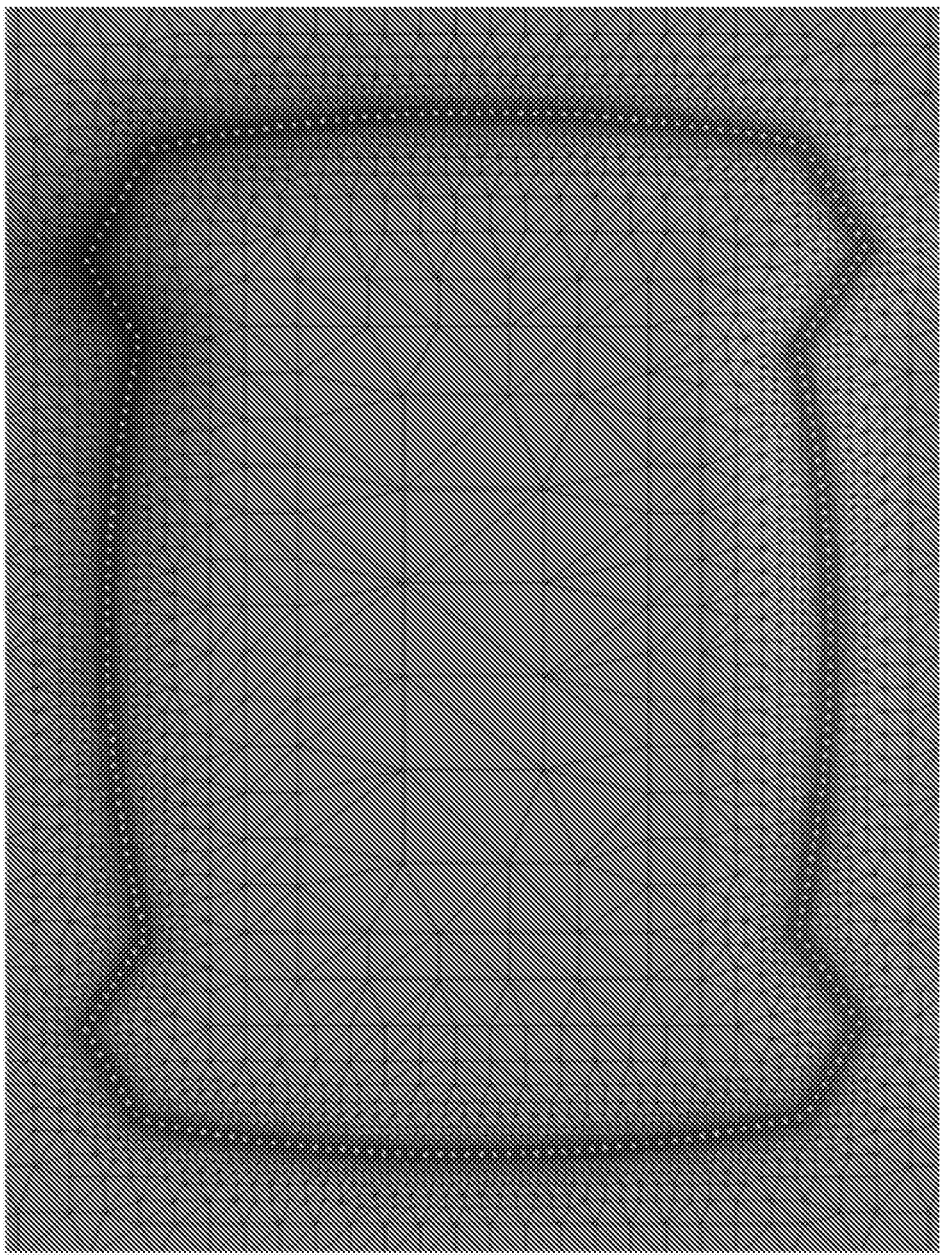
FIG. 11 illustrates an example propagation/diffusion of displacement values.

The displacement values at the sample points may be propagated/diffused in the warp map based the triangle mesh. The amount of propagation/diffusion may be determined based on the size of the triangles. The displacement values may be iteratively propagated/diffused within vertices of the triangle mesh. The displacement values may be propagated/diffused such that portions closer to the frontiers are characterized by greater amount of warping and portions farther to the frontiers are characterized by smoother warping. FIG. 11 illustrates an example propagation/diffusion of displacement values.

The displacement map 118 component may be configured to determine displacement maps for the images. The displacement map may include a densification of the warp map. The displacement map may be determined based on interpolation of the displacement values contained within the warp map and/or other information.

The image modification component 120 may be configured to modify the images. The images may be modified based on the displacement maps and/or other information. For example, the image modification component 120 may include/be included within a rendering engine that interprets the values within the displacement map to modify the images and project the images onto a spherical surface with no/less visible discontinuities along the seams. The image modification component 102 may modify the images in other ways (e.g., applying filters, color/luminance correction/balancing). The modified (e.g., warped) images may be defined as $wI(x,y)=I(x+dx, y+dy)$, with I being the source image, where $(dx, dy)=D(sx, sy)$, and $(sx, sy)$ being scaled coordinates to match the resolution of D from I.

Figure 12:
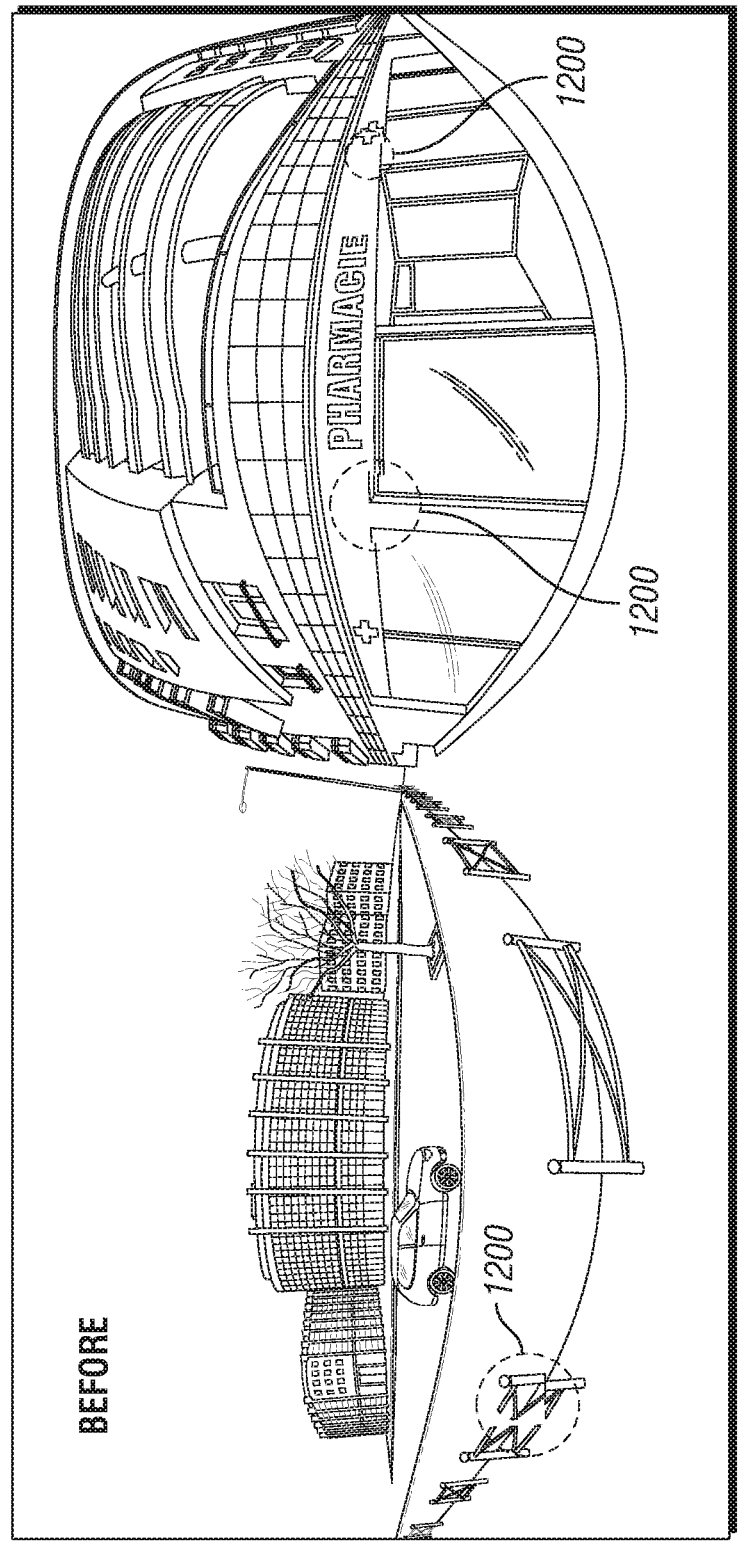
FIG. 12 illustrates an example spherical image without parallax compensation.
Figure 13:
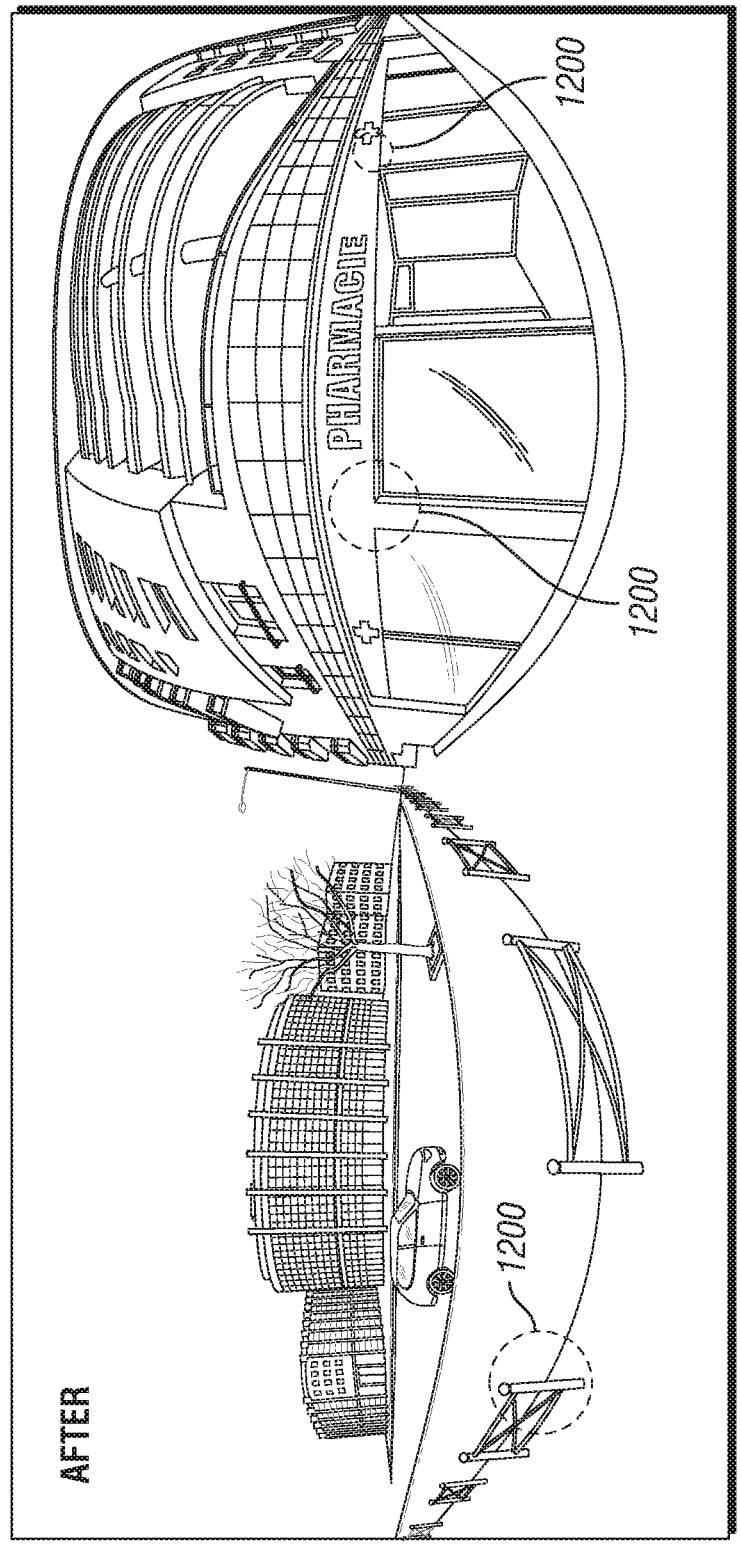
FIG. 13 illustrates an example spherical image with parallax compensation.

For example, FIG. 12 illustrates a spherical image (created by stitching multiple images from multiple image capture devices) without parallax compensation and FIG. 13 illustrates the spherical image with parallax compensation. In FIG. 12, the spherical image may include areas 1200 with visual discontinuities as a result of parallax. In FIG. 13, the visual discontinuities may be reduced/eliminated within the areas 1200. In some implementations, discontinuities may exist after warping the images. Discontinuities may exist because the distance between the object with the discontinuity and the image capture device(s) may have been too close at moment(s) of capture. Larger fields of view of the image capture devices may enable reduction of discontinuities of closer objects. Discontinuities may exist because the warping of images for parallax compensation may be constrained by smoothing/use of continuous warping. In some implementations, a user may be allowed to choose the amount of smoothing and/or switch between continuous/discontinuous warping for one or more portions of the spherical image or the entirety of the spherical image.

In some implementations, the image capture devices may employ electronic rolling shutter compensation. The system 10 may be configured to repeat one or more computations for parallax compensation based on the electronic rolling shutter compensation and/or other information. For example, based on the image capture devices employing electronic rolling shutter compensation to capture a spherical video, the system 10 may recompute one or more of frontier identification, sample distribution, warp parameter determination space, propagation/diffusion mesh, and/or other parameters for the images (video frames) of the spherical video. The parameters may be recomputed periodically and/or based on movement of the image capture devices. If electronic rolling shutter compensation is not needed, one or more parameters may be precomputed for the images (video frames) of the spherical video. For example, if the electronic rolling shutter compensation is not needed, the system 10 may precompute one or more of frontier identification, sample distribution, warp parameter determination space, propagation/diffusion mesh, and/or other parameters for the images of the spherical video.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components.

While the computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11 may be configured to execute one or more additional computer program components that may perform some or all of the functionality attributed to one or more of computer program components described herein.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
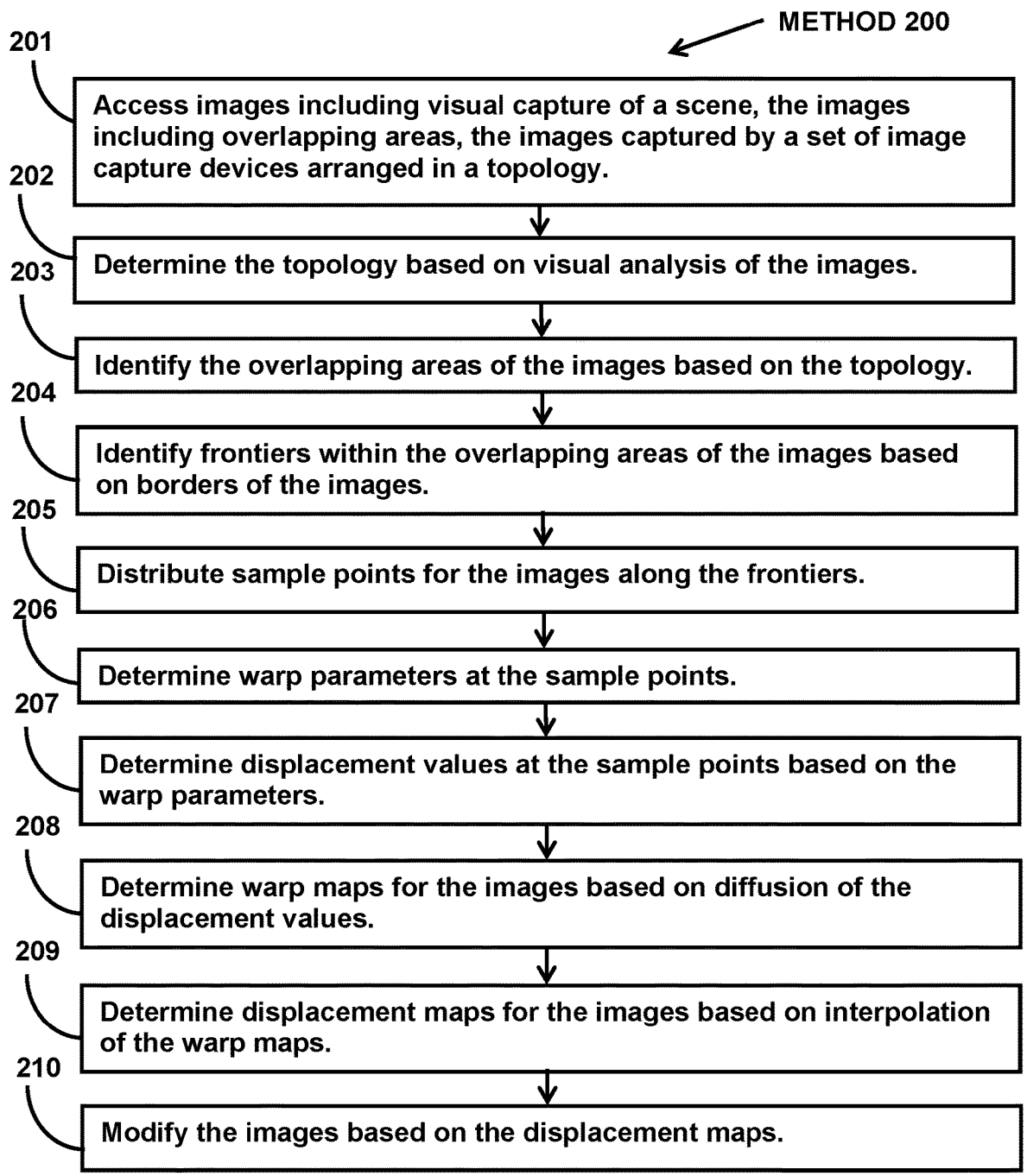
FIG. 2 illustrates a method for providing parallax compensation.

FIG. 2 illustrates method 200 for providing parallax compensation. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, images including visual capture of a scene may be accessed. The images may include overlapping areas. The overlapping areas may include visual capture of same portions of the scene. The images may be captured by a set of image capture devices. The set of image capture devices may include a first image capture device comprising a first optical element and a second image capture device comprising a second optical element. The set of image capture devices may be arranged in a topology during the capture of the images. The topology may be characterized by orientations, focals, distortions, and optical centers of the first optical element and the second optical element. In some implementation, operation 201 may be performed by a processor component the same as or similar to the access component 102 (Shown in FIG. 1 and described herein).

At operation 202, topology may be determined based on visual analysis of the images. In some implementations, operation 202 may be performed by a processor component the same as or similar to the topology component 104 (Shown in FIG. 1 and described herein).

At operation 203, the overlapping areas of the images may be identified based on the topology. In some implementations, operation 203 may be performed by a processor component the same as or similar to the overlapping area component 106 (Shown in FIG. 1 and described herein).

At operation 204, frontiers within the overlapping areas of the images may be identified based on borders of the images. The frontiers may include points of farthest distances from the borders of the images. Individual frontiers may be defined by two corners. In some implementations, operation 204 may be performed by a processor component the same as or similar to the frontier component 108 (Shown in FIG. 1 and described herein).

At operation 205, sample points for the images may be distributed along the frontiers. In some implementations, operation 205 may be performed by a processor component the same as or similar to the sample point component 110 (Shown in FIG. 1 and described herein).

At operation 206, warp parameters may be determined at the sample points. The warp parameters may include an anti-symmetric warping portion and a symmetric warping portion. In some implementations, operation 206 may be performed by a processor component the same as or similar to the warp parameter component 112 (Shown in FIG. 1 and described herein).

At operation 207, displacement values may be determined at the sample points based on the warp parameters. In some implementations, operation 207 may be performed by a processor component the same as or similar to the displacement component 114 (Shown in FIG. 1 and described herein).

At operation 208, warp maps for the images may be determined based on diffusion of the displacement values. In some implementations, operation 208 may be performed by a processor component the same as or similar to the warp map component 116 (Shown in FIG. 1 and described herein).

At operation 209, displacement maps for the images may be determined based on interpolation of the warp maps. In some implementations, operation 209 may be performed by a processor component the same as or similar to the displacement map component 118 (Shown in FIG. 1 and described herein).

At operation 210, the images may be modified based on the displacement maps. In some implementations, operation 210 may be performed by a processor component the same as or similar to the image modification component 120 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that compensates for parallax of multi-camera capture, the system comprising:
   one or more physical processors configured by machine-readable instructions to:
      access images including visual capture of a scene, the images including overlapping areas, the overlapping areas including visual capture of same portions of the scene, the images captured by a set of image capture devices, wherein the set of image capture devices includes a first image capture device comprising a first optical element and a second image capture device comprising a second optical element, the set of image capture devices arranged in a topology during the capture of the images, the topology characterized by orientations, focals, distortions, and/or optical centers of the first optical element and the second optical element;
      determine the topology based on visual analysis of the images;
      identify the overlapping areas of the images based on the topology;
      identify frontiers within the overlapping areas of the images based on borders of the images, the frontiers including points of farthest distances from the borders of the images, wherein individual frontiers are defined by two corners;
      distribute sample points for the images along the frontiers;
      determine warp parameters at the sample points, the warp parameters including an anti-symmetric warping portion and a symmetric warping portion;
      determine displacement values at the sample points based on the warp parameters;
      determine warp maps for the images based on diffusion of the displacement values;
      determine displacement maps for the images based on interpolation of the warp maps; and
      modify the images based on the displacement maps.

2. The system of claim 1, wherein the warp parameters are determined based on visual similarity, spatial smoothness, and temporal smoothness.

3. The system of claim 1, wherein the warp parameters are determined based on positions of visual similarity between two of the images.

4. The system of claim 1, wherein the warp parameters are determined based on a sliding temporal window.

5. The system of claim 1, wherein the displacement values are determined further based on a conversion of the warp parameters from a determination space to a source space.

6. The system of claim 5, wherein the warp parameters are converted based on the topology.

7. The system of claim 1, wherein the warp maps are determined further based on triangle meshes over the images, the triangle meshes including triangles with sizes determined based on distances to the sample points.

8. The system of claim 1, wherein the images include video frames of videos captured by the set of image capture devices.

9. The system of claim 1, wherein the one or more physical processors are further configured to repeat one or more computations based on electronic rolling shutter compensation.

10. A method for compensating parallax of multi-camera capture, the method performed by a computing system including one or more processors, the method comprising:

accessing, by the computing system, images including visual capture of a scene, the images including overlapping areas, the overlapping areas including visual capture of same portions of the scene, the images captured by a set of image capture devices, wherein the set of image capture devices includes a first image capture device comprising a first optical element and a second image capture device comprising a second optical element, the set of image capture devices arranged in a topology during the capture of the images, the topology characterized by orientations, focals, distortions, and/or optical centers of the first optical element and the second optical element;

determining, by the computing system, the topology based on visual analysis of the images;

identifying, by the computing system, the overlapping areas of the images based on the topology;

identifying, by the computing system, frontiers within the overlapping areas of the images based on borders of the images, the frontiers including points of farthest distances from the borders of the images, wherein individual frontiers are defined by two corners;

distributing, by the computing system, sample points for the images along the frontiers;

determining, by the computing system, warp parameters at the sample points, the warp parameters including an anti-symmetric warping portion and a symmetric warping portion;

determining, by the computing system, displacement values at the sample points based on the warp parameters;

determining, by the computing system, warp maps for the images based on diffusion of the displacement values;

determining, by the computing system, displacement maps for the images based on interpolation of the warp maps; and modifying, by the computing system, the images based on the displacement maps.

11. The method of claim 10, wherein the warp parameters are determined based on visual similarity, spatial smoothness, and temporal smoothness.

12. The method of claim 10, wherein the warp parameters are determined based on positions of visual similarity between two of the images.

13. The method of claim 10, wherein the warp parameters are determined based on a sliding temporal window.

14. The method of claim 10, wherein the displacement values are determined further based on a conversion of the warp parameters from a determination space to a source space.

15. The method of claim 14, wherein the warp parameters are converted based on the topology.

16. The method of claim 10, wherein the warp maps are determined further based on triangle meshes over the images, the triangle meshes including triangles with sizes determined based on distances to the sample points.

17. The method of claim 10, wherein the images include video frames of videos captured by the set of image capture devices.

18. The method of claim 10, further comprising repeating, by the computing system, one or more computations based on electronic rolling shutter compensation.

19. A system that compensates for parallax of multi-camera capture, the system comprising:

one of more physical processors configured by machine-readable instructions to:

access images including visual capture of a scene, the images including overlapping areas, the overlapping areas including visual capture of same portions of the scene, the images captured by a set of image capture devices, wherein the set of image capture devices includes a first image capture device comprising a first optical element and a second image capture device comprising a second optical element, the set of image capture devices arranged in a topology during the capture of the images, the topology characterized by orientations, focals, distortions, and optical centers of the first optical element and the second optical element;

determine the topology based on visual analysis of the images;

identify the overlapping areas of the images based on the topology;

identify frontiers within the overlapping areas of the images based on borders of the images, the frontiers including points of farthest distances from the borders of the images, wherein individual frontiers are defined by two corners;

distribute sample points for the images along the frontiers;

determine warp parameters at the sample points, the warp parameters including an anti-symmetric warping portion and a symmetric warping portion;

determine displacement values at the sample points based on a conversion of the warp parameters from a determination space to a source space, the warp parameters converted based on the topology;

determine warp maps for the images based on diffusion of the displacement values and triangle meshes over the images, the triangle meshes including triangles with sizes determined based on distances to the sample points;

determine displacement maps for the images based on interpolation of the warp maps; and modify the images based on the displacement maps.

20. The system of claim 19, wherein the warp parameters are determined based on visual similarity, spatial smoothness, temporal smoothness, positions of visual similarity between two of the images, and a sliding temporal window.

* * * * *